Patented July 7, 1925.

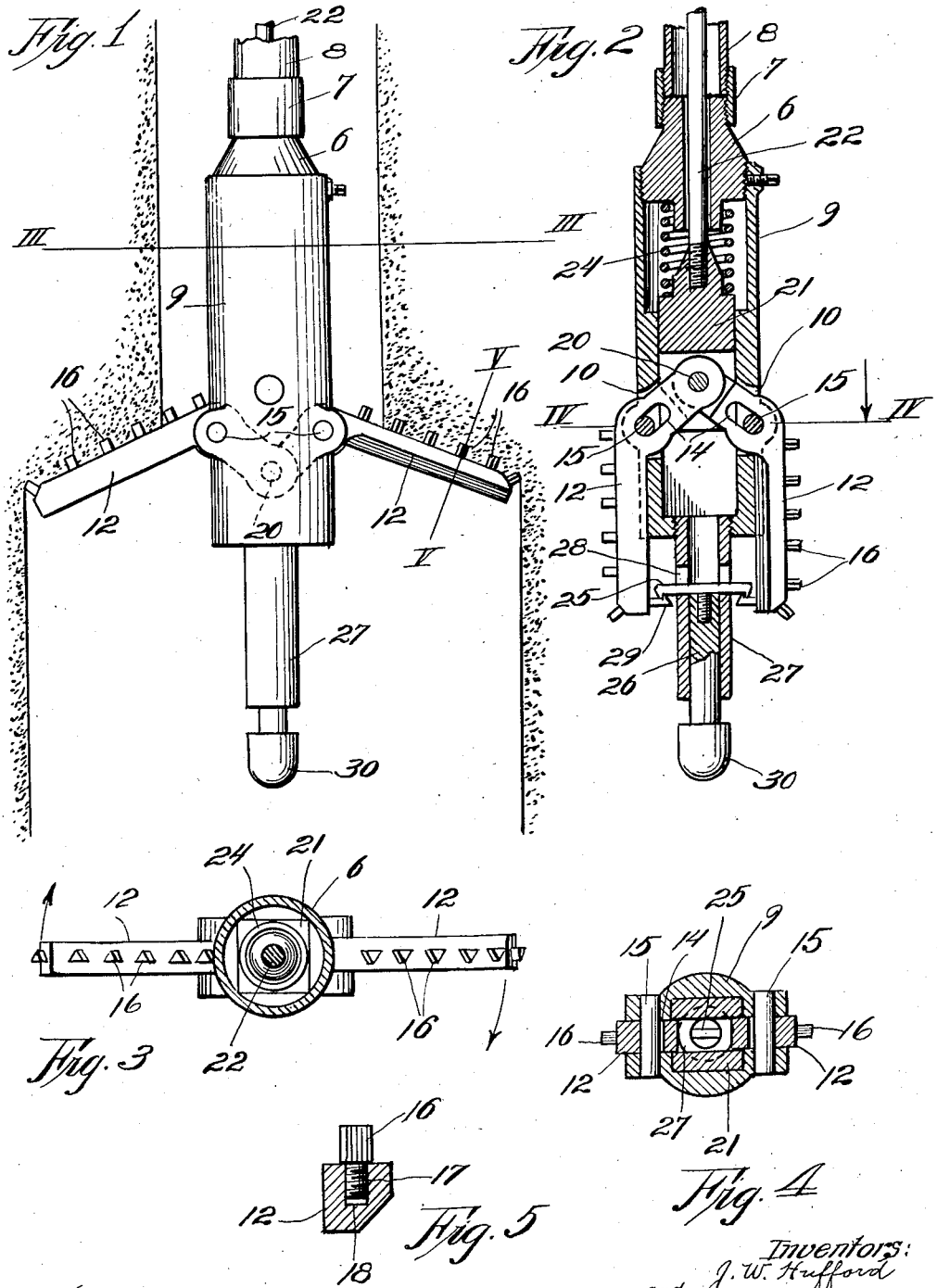

1,544,757

UNITED STATES PATENT OFFICE.

JOHN W. HUFFORD, OF KANSAS CITY, AND JOEL B. MAYES, OF PARKER, KANSAS, SAID MAYES ASSIGNOR TO SAID HUFFORD.

OIL-WELL REAMER.

Application filed February 5, 1923. Serial No. 616,945.

*To all whom it may concern:*

Be it known that we, JOHN W. HUFFORD and JOEL B. MAYES, citizens of United States, and residents of Kansas City, Wyandotte County, Kansas, and Parker, Linn County, Kansas, respectively, have invented a certain new and useful Improvement in Oil-Well Reamers, of which the following is a complete specification.

The present invention relates to devices designed for use in the cutting or reaming out of the bottoms of wells, one of the main objects being to provide a simple device adapted to be attached to the lower end of the pump tubing and operated through the medium of said tubing for effecting the reaming operation by the rotary movement of a pair of reaming cutters which are adapted to be expanded in engagement with the material forming the wall at the bottom of the well.

For carrying out the invention, we have devised a reamer comprising a pair of reaming cutters adapted for swinging movement in opposite directions, and provided with means for retaining said cutters in retracted relation and also operable to release said cutters for movement, in response to automatic means, for actuating the same into outwardly spread relation for effecting the reaming operation.

With the foregoing general object in view, the invention will now be described by reference to the accompanying drawing illustrating one form of construction which we have devised for embodying the proposed improvements, after which the novel features therein will be particularly set forth and claimed.

In the drawing—

Figure 1 is an elevation, illustrating a reaming device constructed in accordance with the present invention, and in its operative relation to the bottom portion of a well, and having the reaming cutters spread outwardly in position for effecting the reaming operation;

Figure 2 is a vertical sectional view of the device, and showing the reaming cutters in retracted or inoperative position;

Figure 3 is a transverse section taken on the line III—III of Figure 1;

Figure 4 is a transverse section taken on the line IV—IV of Figure 2; and

Figure 5 is an enlarged detail section on the line V—V of Figure 1.

Referring now to the drawing in detail, this illustrates the improved reamer device as comprising a head or attaching portion 6 adapted to be connected by means of a suitable union or collar 7 to the lower end of a pump tubing 8, as illustrated in Figures 1 and 2. The lower portion of the head member 6 is suitably threaded for attachment to the upper end of a cylinder 9 having diametrically opposite openings 10 for pivotally accommodating a pair of reaming cutters 12 which are somewhat angular in form, and are formed with slots 14 at their bent portions for sliding engagement with pivot pins 15 provided in the openings 10, as clearly illustrated in Figures 2 and 4. The outer edges of the cutter members 12 are provided with a series of reaming or cutting elements 16 in the form of bits which are of triangular-shape in cross section and adapted to be so attached to the members 12 as to present one of the edges of each element 16 in the direction of cutting movement, as clearly indicated in Figure 3. Preferably, the cutting elements 16 are made and attached so as to be renewable, and accordingly are provided with threaded shanks 17 (see Figure 5) adapted to be screwed into corresponding sockets 18 in the members 12. The inner ends of the reaming cutter members 12 are connected by a common pivotal connection 20 to a plunger member 21 operating axially within the cylinder 9, and adapted to make suitable threaded connection to the lower end of a sucker rod 22, as illustrated in Figure 2. Interposed between the upper end of the plunger 21 and the head member 6 is a coil spring 24, which acts normally and automatically to force the plunger member 21 downwardly within the cylinder 9, and thus swinging the reaming cutter members 12 about their pivot pins 15 into outwardly spread relation, as illustrated in Figure 1, into engagement with the material forming the wall at the bottom of the well bore.

For maintaining the cutter members 12 normally latched against spreading movement, or in the inoperative position illustrated in Figure 2, I provide a latch bar 25 secured to the upper end of a slide member 26 mounted in a sleeve 27 secured to the lower end of the cylinder 9, the latch bar 25 projecting through slots 28 in the sides of the sleeve 27, for engagement with catch elements 29 at the free ends of the members 12. The lower end of the slide member 26 is formed with a foot-piece 30, adapted, on lowering of the apparatus sufficiently to engage the foot-piece 30 with the bottom of the well, to effect disengagement of the latch bar 25 from the catch elements 29, and thereby releasing the reaming cutter members 12 to the spreading action of the spring 24.

Preferably, the plunger 21 is of square form, to positively prevent any rotary movement thereof within the cylinder 9; also, the outer portions of the reamers 12 are beveled somewhat in the direction of their rotating movement, to facilitate such movement in an obvious manner. Moreover, the cutting elements 16 of each of the reamer members 12 are arranged in staggered relation with reference to the elements 16 of the other reamer member, so that each cutting element operates through a separate, individual circular path.

In the operation of the device, it is apparent that on lowering the same to the bottom of the well, the engagement of the foot piece 30 with the well bottom will release the latch 25 from engagement with the reaming cutter members 12, so that the latter are free to swing outward into engagement with the walls of the well bore; thereafter, rotation of the device will effect the cutting or reaming operation, designed for removing any crusted formations, such as accumulations of paraffin or asphalt, which act to obstruct the flow of the well. As the cutting operation proceeds, the members 12 will swing out farther and farther, until they assume approximately the position illustrated in Figure 1, so that the size of the well bore or reservoir space around the bottom is materially increased. When the operation is completed, the reamer members may be retracted by pulling upward upon the rod 22, and said members will be relatched by means of the latch bar 25.

We claim:

1. A well reaming device comprising an attaching and supporting structure, a pair of reaming cutters carried by said structure and adapted for swinging movement in opposite directions, means operating through the interior of said structure for actuating said cutters into outwardly spread relation, and independent means for latching said cutters in retracted position.

2. A well reaming device comprising an attaching and supporting structure, a pair of reaming cutters carried by said structure and adapted for swinging movement in opposite directions, means operating through the interior of said structure for actuating said cutters into outwardly spread relation, and a latching device adapted for retaining engagement with the free ends of said cutters to hold the latter in retracted position, said latching device having a foot-piece adapted to be actuated, on lowering of the reaming device, for releasing said latching device from engagement with said cutters.

3. A well reaming device comprising an attaching and supporting structure, a pair of reaming cutters carried by said structure and adapted for swinging movement in opposite directions, means pivotally connected to the inner ends of said cutters and operative to actuate the same into outwardly spread relation, and means for latching said cutters in retracted position.

4. A well reaming device comprising a cylinder having an attaching element, a pair of reaming cutters pivotally carried by said cylinder, a plunger pivoted to the inner ends of said cutters and operative to actuate the same into outwardly spread relation, and a latch member movably carried by the lower end of said cylinder for latching said cutters in retracted position.

In witness whereof we hereunto affix our signatures.

JOHN W. HUFFORD.
JOEL B. MAYES.